US011722019B2

(12) United States Patent
Shi et al.

(10) Patent No.: US 11,722,019 B2
(45) Date of Patent: Aug. 8, 2023

(54) STATOR ASSEMBLY WITH HEAT RECOVERY FOR ELECTRIC MACHINES

(71) Applicant: DANA TM4 INC., Boucherville (CA)

(72) Inventors: Ruisheng Shi, Montreal (CA); Martin Houle, Laval (CA); Mohammad Adib Ghadamyari, Boucherville (CA)

(73) Assignee: DANA TM4, INC., Boucherville (CA)

( * ) Notice: Subject to any disclaimer, the term of this patent is extended or adjusted under 35 U.S.C. 154(b) by 209 days.

(21) Appl. No.: 16/490,253

(22) PCT Filed: Feb. 27, 2018

(86) PCT No.: PCT/CA2018/050228
§ 371 (c)(1),
(2) Date: Aug. 30, 2019

(87) PCT Pub. No.: WO2018/157242
PCT Pub. Date: Sep. 7, 2018

(65) Prior Publication Data
US 2020/0076251 A1    Mar. 5, 2020

Related U.S. Application Data

(60) Provisional application No. 62/466,093, filed on Mar. 2, 2017.

(51) Int. Cl.
*H02K 1/14* (2006.01)
*H02K 15/06* (2006.01)
*H02K 9/00* (2006.01)
*H02K 1/18* (2006.01)
*H02K 9/22* (2006.01)

(52) U.S. Cl.
CPC ............. *H02K 1/146* (2013.01); *H02K 1/185* (2013.01); *H02K 9/00* (2013.01); *H02K 15/06* (2013.01); *H02K 9/227* (2021.01)

(58) Field of Classification Search
CPC ........ H02K 15/06; H02K 1/146; H02K 1/185; H02K 1/20; H02K 3/487; H02K 9/00; H02K 9/22
USPC ......................................................... 310/180
See application file for complete search history.

(56) References Cited

U.S. PATENT DOCUMENTS

| 5,051,634 A | 9/1991 | Overton |
| 9,685,833 B2* | 6/2017 | Bulatow ................. H02K 3/34 |
| 2005/0099086 A1 | 5/2005 | Schunk et al. |

(Continued)

FOREIGN PATENT DOCUMENTS

| CN | 102742129 A | 10/2012 |
| CN | 203071667 U | 7/2013 |

(Continued)

OTHER PUBLICATIONS

Translation of WO 2014108276 A2 (Year: 2014).*

(Continued)

*Primary Examiner* — Alex W Mok
(74) *Attorney, Agent, or Firm* — McCoy Russell LLP

(57) ABSTRACT

The present disclosure is concerned with a stator for an electric machine comprising a plurality of stacked laminations each including inwardly facing slots defining inwardly facing teeth configured to receive prewound coils thereonto. Each slot including a generally triangular projection configured and sized as to be in proximity of the prewound coils.

6 Claims, 5 Drawing Sheets

(56) References Cited

U.S. PATENT DOCUMENTS

| | | | | |
|---|---|---|---|---|
| 2008/0197724 A1* | 8/2008 | Cullen | ................... | H02K 3/24 |
| | | | | 310/58 |
| 2010/0253176 A1 | 10/2010 | Ovrebo et al. | | |
| 2015/0076935 A1* | 3/2015 | Bulatow | ............... | H02K 3/487 |
| | | | | 310/214 |

FOREIGN PATENT DOCUMENTS

| | | | | | |
|---|---|---|---|---|---|
| DE | 102013214106 A1 | | 1/2015 | | |
| EP | 1555734 A1 | | 7/2005 | | |
| EP | 2136455 A1 | | 12/2009 | | |
| EP | 2818740 A1 | * | 12/2014 | ............ | F16C 32/047 |
| JP | 2001211587 A | * | 8/2001 | ............ | H02K 3/345 |
| WO | 2011074973 A1 | | 6/2011 | | |
| WO | WO-2014108276 A2 | * | 7/2014 | ............. | H02K 3/487 |

OTHER PUBLICATIONS

Translation of JP 2001211587 A (Year: 2001).*
China National Intellectual Property Administration, Office Action and Search Report Issued in Application No. 201880014968.6, dated Apr. 23, 2021, 18 pages. (Submitted with Partial Translation).
ISA Canadian Intellectual Property Office, International Search Report and Written Opinion Issued in Application No. PCT/CA2018/050228, dated May 3, 2018, WIPO, 7 pages.
European Patent Office, Extended European Search Report Issued in Application No. 18760822.9, dated Nov. 30, 2020, Germany, 9 pages.

* cited by examiner

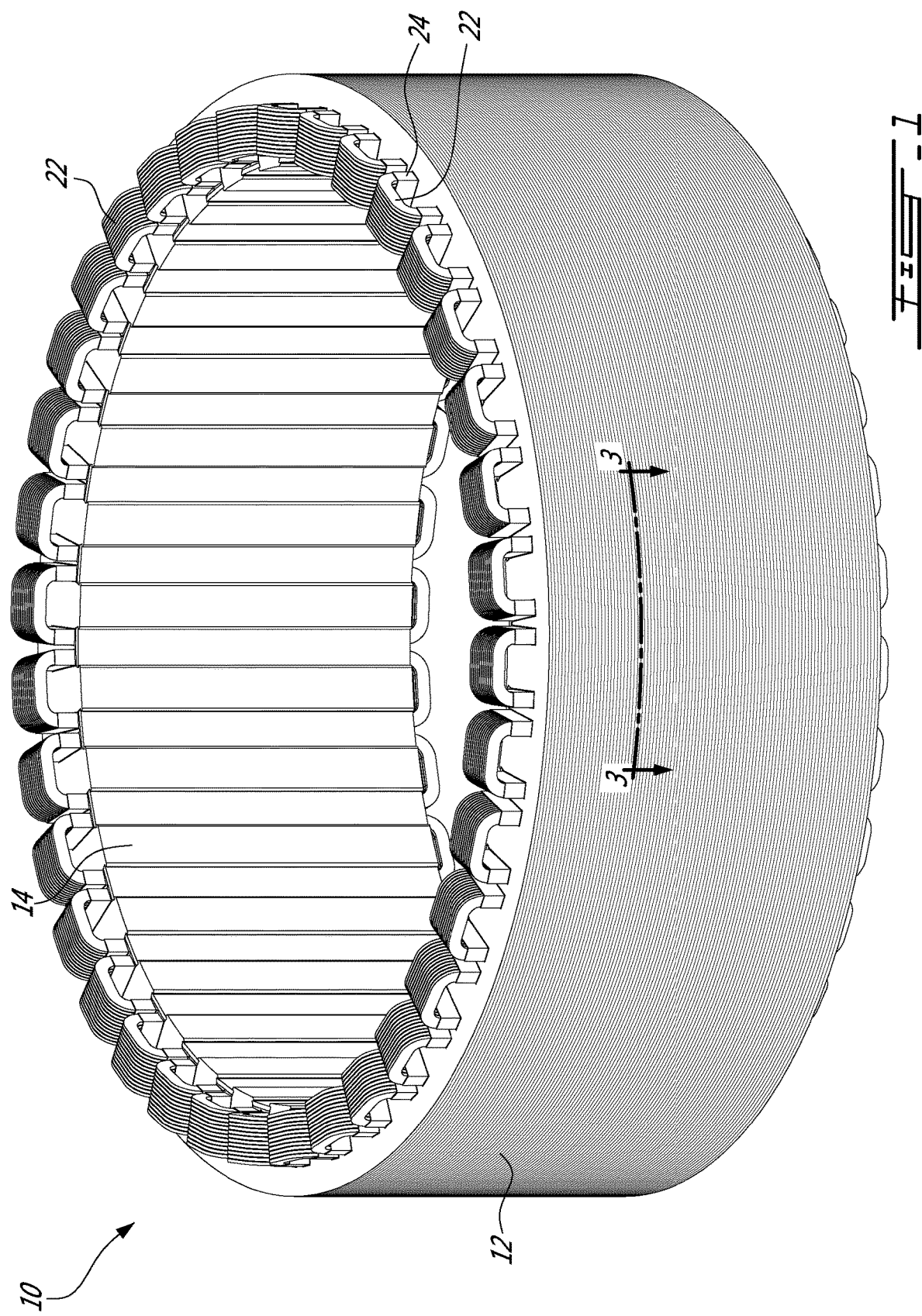

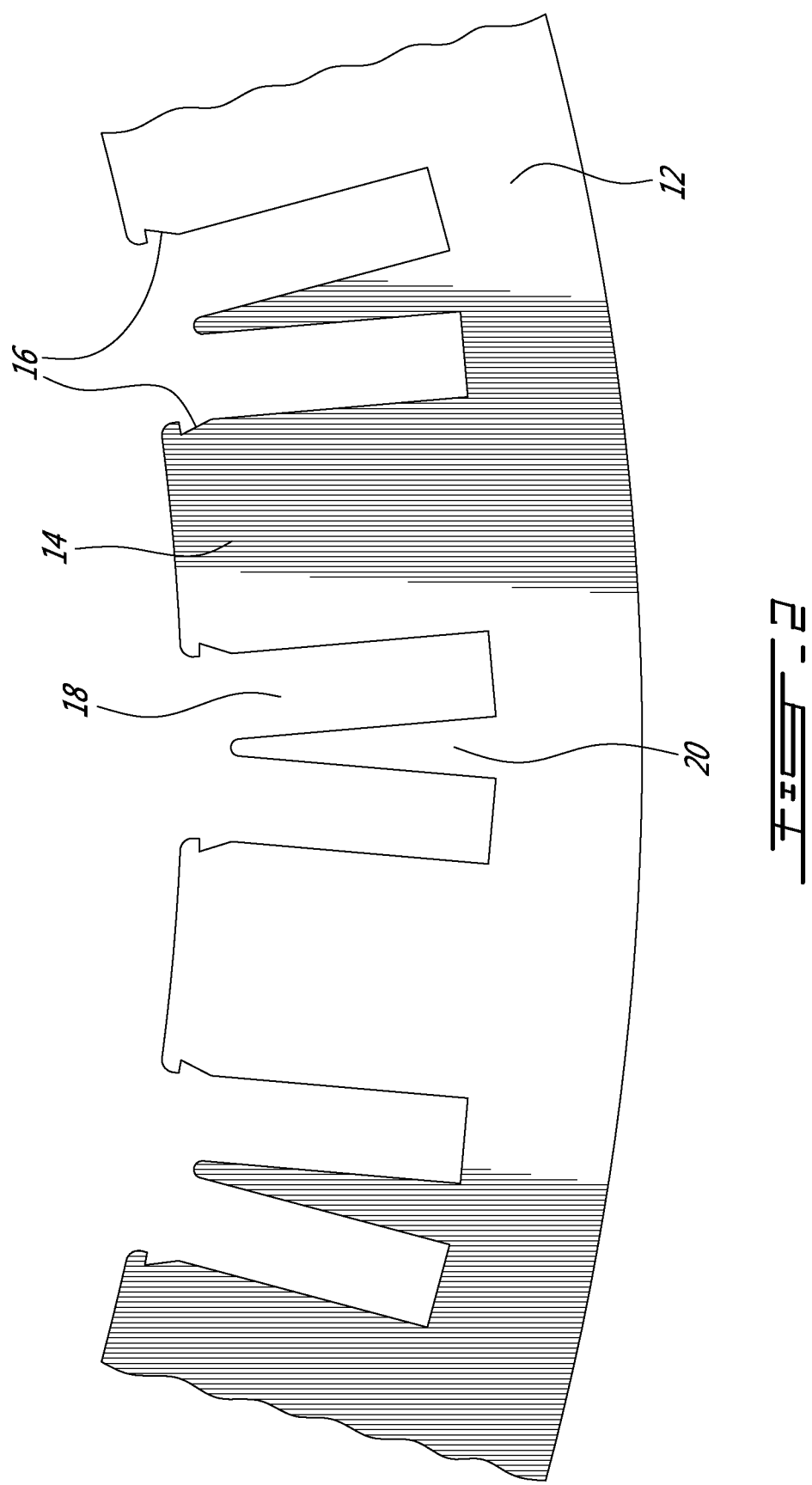

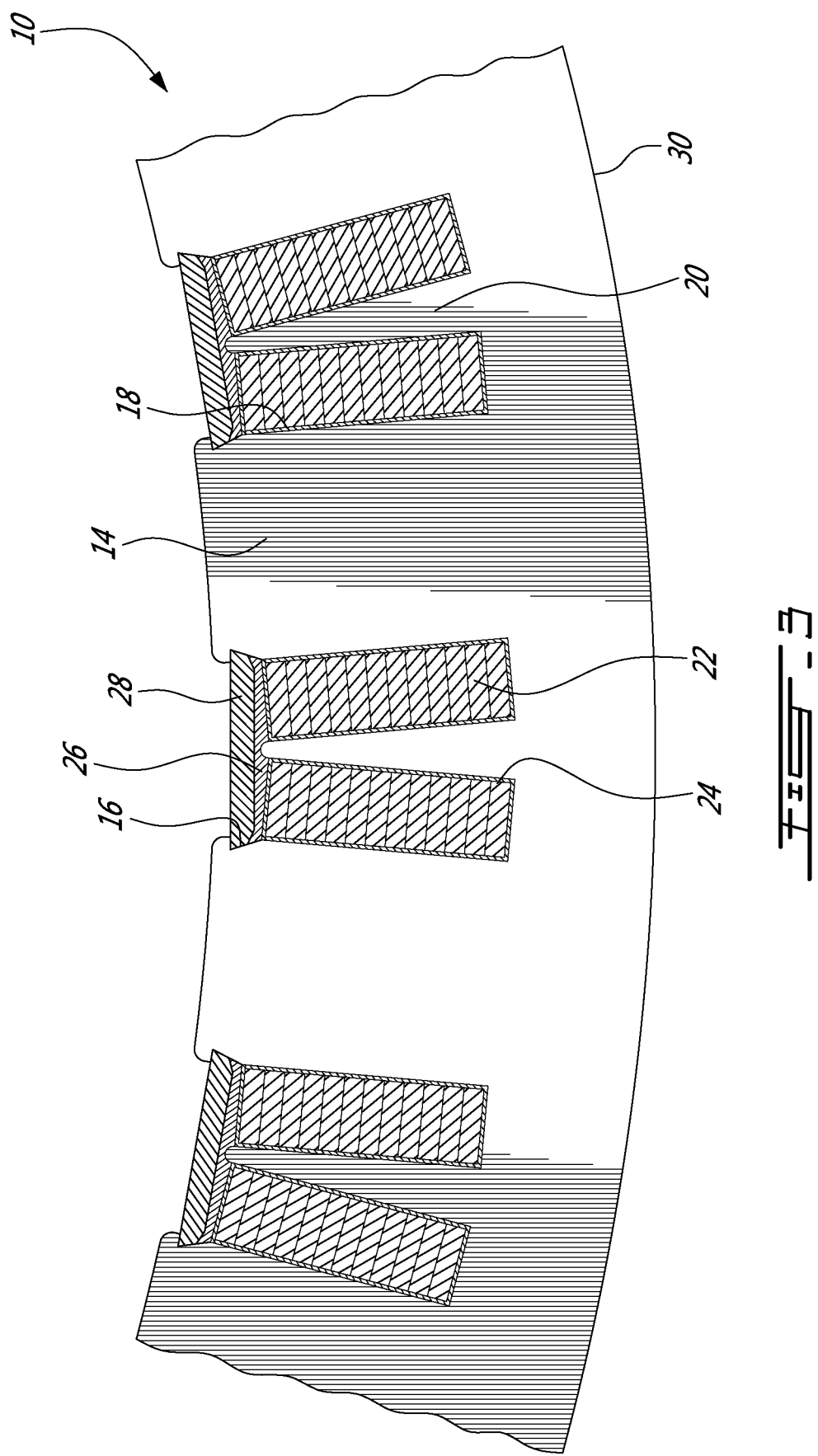

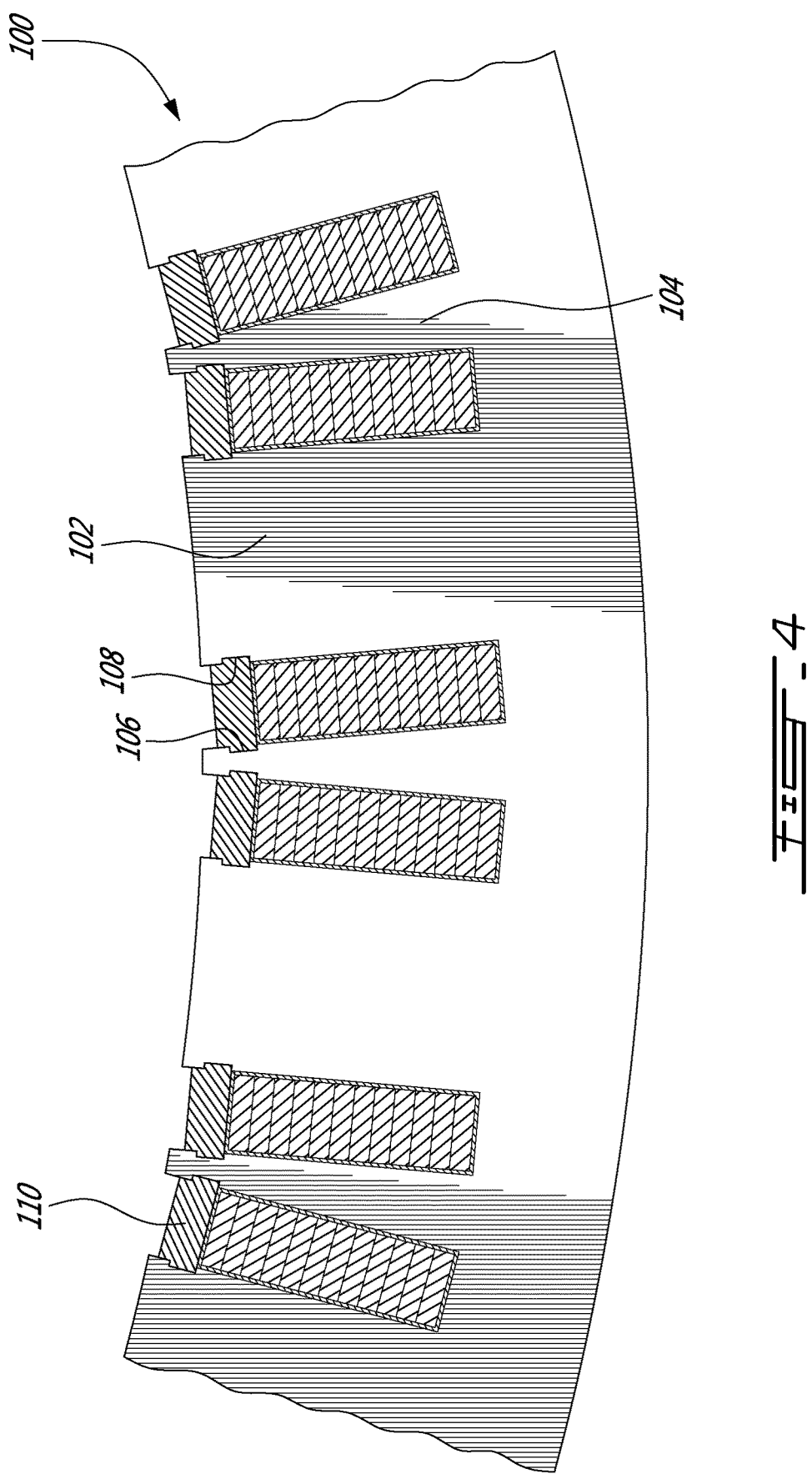

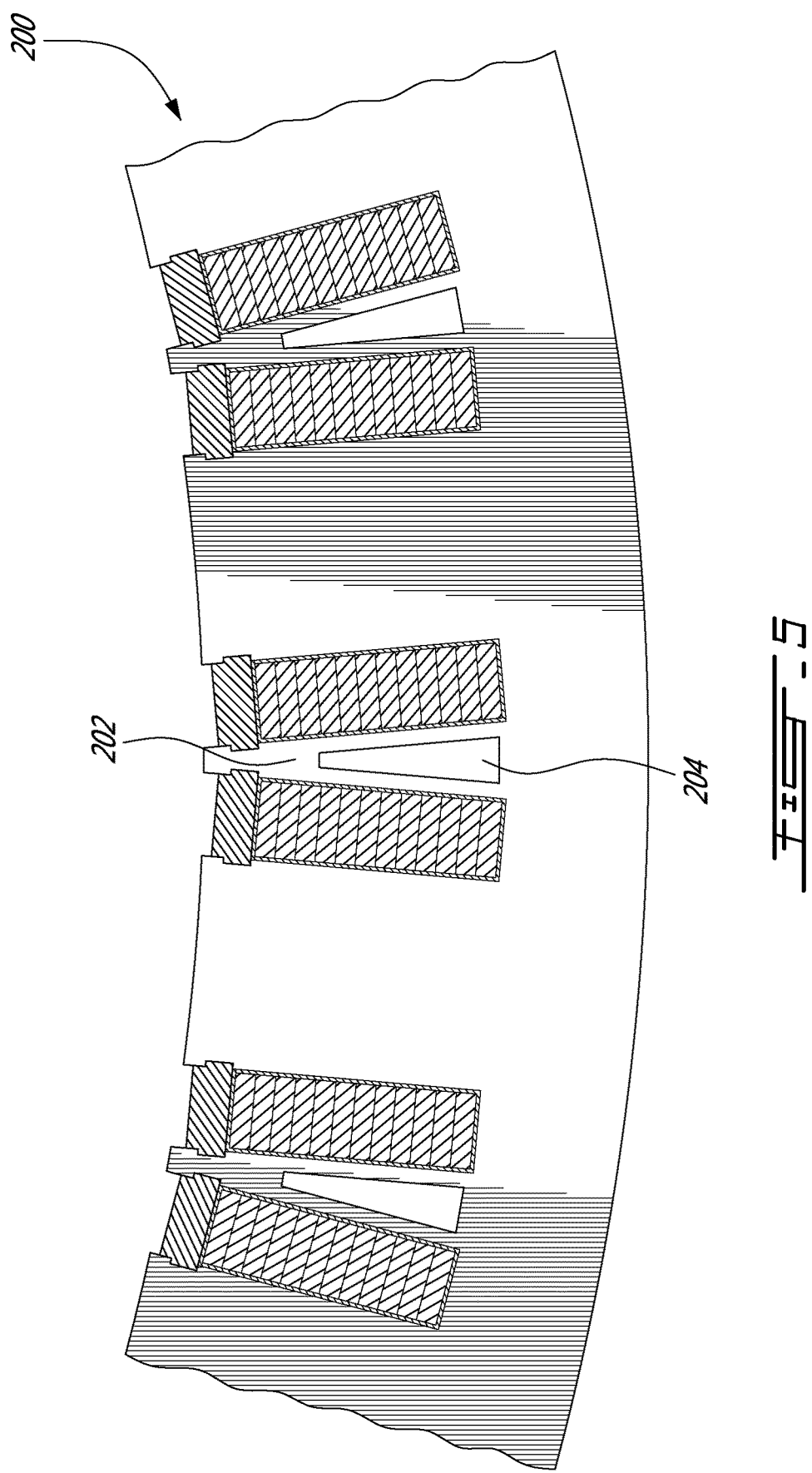

STATOR ASSEMBLY WITH HEAT RECOVERY FOR ELECTRIC MACHINES

FIELD

The present disclosure generally relates to electric machines. More specifically, the present disclosure is concerned with a stator assembly with heat recovery for an electric machine.

BACKGROUND

Electric machines such as electric motors and generators are well known in the art. They are usually provided with a stator and a rotor, both coaxially mounted to a housing.

Conventionally, stator assemblies are made of a stack of laminations that are provided with inwardly facing slots allowing coils to be formed therein. When rectangular wire is used to form the coils, the coils are generally formed prior to their insertion in the stator slots. The rectangular configuration of the wire makes it so that the stator slots are not fully filled by the coils, which leaves a void between adjacent coils, leading to a poor recovery of the heat generated in the coils when the electric machine is used.

BRIEF DESCRIPTION OF THE DRAWINGS

In the appended drawings:

FIG. 1 is a schematic end view of a stator according to a first illustrative embodiment;

FIG. 2 is a portion of a lamination forming the stator of FIG. 1;

FIG. 3 is a sectional view taken along line 3-3 of FIG. 1;

FIG. 4 is a sectional view similar to FIG. 3, but illustrating a second illustrative embodiment; and FIG. 5 is a sectional view similar to FIG. 3, but illustrating a third illustrative embodiment.

DETAILED DESCRIPTION

In accordance with an illustrative embodiment, there is provided a stator for an electric machine comprising a plurality of stacked laminations including inwardly facing slots defining inwardly facing teeth configured to receive prewound coils thereonto; each slot including a generally triangular projection configured and sized as to be in proximity of the prewound coils.

In accordance with an other aspect, there is provided a stator for an electric machine having a generally cylindrical body provided an inner surface and an outer surface, the inner surface including slots defining inwardly facing teeth configured to receive prewound coils thereonto; each slot including a generally triangular projection configured and sized as to be in proximity of the prewound coils.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", rear", "upwardly", "downwardly", etc. is used. It is to be understood that such terminology is used for ease of description and in a relative sense only and is not to be taken in any way as a limitation upon the scope of the present disclosure.

Further, in this specification, the terms "axial direction", "axially", "axial", and the like, refer to the direction of the rotation axis of the rotor, the direction of the central axis of the cylindrical stator, and the directions corresponding to them, the terms "radial direction", "radially", "radial", and the like, refer to the directions perpendicular to such axial directions, and the terms "circumferential direction", "circumferentially", "circumferential", and the like, refer to each direction along the circumference of a circle drawn about a given point of the rotation axis on a plane perpendicular to the rotation axis.

The expression "connected" should be construed herein and in the appended claims broadly so as to include any cooperative or passive association between mechanical parts or components. For example, such parts may be assembled together by direct coupling, or indirectly coupled using further parts. The coupling can also be remote, using for example a magnetic field or else.

Other objects, advantages and features of the stator assembly with heat recovery for electric machines will become more apparent upon reading of the following non-restrictive description of illustrative embodiments thereof, given by way of example only with reference to the accompanying drawings.

Generally stated, illustrative embodiments are concerned with a stator assembly for an internal rotor electric machine using prewound coils made of rectangular wires. The inwardly facing slots in the stator each include a generally triangular projection that fills the space between adjacent coils to thereby improve the recovery of the heat generated in the coils during the operation of the electric machine.

Turning now to FIGS. 1 to 3 of the appended drawings, a stator 10 according to a first illustrative embodiment will be described.

As can be seen from FIG. 1, the stator 10 includes a plurality of generally circular laminations 12 each provided with inwardly projecting teeth 14.

As can be better seen from FIG. 2, the teeth 14 include wedge-receiving indentations 16 and define coil-receiving slots 18. Each slot 18 includes a generally triangular space filling projection 20 integral with the lamination 12. The slots 18 and projections 20 are so configured and sized that the rectangular wire forming the prewound coils 22 (see FIG. 1) with their respective insulating papers 24 can snugly fit therein.

FIG. 3 is a sectional view of FIG. 1 taken along line 3-3 of FIG. 1. As can be seen from this figure, the coils 22, wrapped in insulating paper 24 are inserted in the slots 18, space filling resin 26 has been cured about the coils 22 and wedges 28 have been inserted in the indentations 16 to close the slots 18.

One skilled in the art will understand that the generally triangular projection 20 being in close proximity of the coils 22 allow heat generated in the coils during the operation of the electric machine (not shown) to be removed from the coils.

Of course, a cooling strategy is used to remove the heat present in the stator. For example, a fluid cooling assembly (not shown) can be applied to the external surface 30 of the stator 10.

FIG. 4 illustrates a stator 100 according to a second illustrative embodiment. Generally stated, the major difference between the stator 10 and the stator 100 concerns the height of the generally triangular space filling projections 104 which are the same height as the teeth 102. In other words, the projections 104 and the teeth 102 define an inner surface of the stator 100. Accordingly, the projections 104 include wedge-receiving indentations 106 similar to the indentations 108 of the teeth 102.

Therefore, two wedges 110 are required between adjacent teeth 102 to close the coil receiving slots.

One will also notice that while the shape of the indentations 106 and 108 are different from the indentation 16 of FIG. 3, it is for illustration purpose and that these indentations could be identical.

Finally FIG. 5 illustrates a stator 200 according to a third illustrative embodiment. The stator 200 is similar to the stator 100 of FIG. 4. The major difference therebetween concerns the generally triangular space filling projection 202 that includes a generally triangular void 204.

The void 204 decreases the amount of field that flows through the projection 202. Furthermore, a non-magnetic cooling fluid could optionally be made to flow through the void 204 to thereby improve the cooling of the stator 200.

Of course, while laminations have been described as making the stator, other technologies, such as compressed metallic powders, could be used.

It is to be understood that the stator assembly with heat recovery for electric machines is not limited in its application to the details of construction and parts illustrated in the accompanying drawings and described hereinabove. The stator assembly with heat recovery for electric machines is capable of other embodiments and of being practiced in various ways. It is also to be understood that the phraseology or terminology used herein is for the purpose of description and not limitation. Hence, although the present stator assembly with heat recovery for electric machines has been described hereinabove by way of illustrative embodiments thereof, it can be modified, without departing from the spirit, scope and nature thereof.

The following clauses are provided as supplemental description:

1. A stator for an electric machine comprising a plurality of stacked laminations each including inwardly facing slots defining inwardly facing teeth configured to receive prewound coils thereonto; each slot including a generally triangular projection configured and sized as to be in proximity of the prewound coils.

2. The stator as recited in clause 1, wherein the generally triangular projection includes a void.

3. The stator as recited in any of the preceding clause, further comprising at least one wedge used to close each slot.

4. The stator as recited in any of the preceding clause, wherein the stator includes a generally cylindrical inner surface and wherein the generally triangular projections are generally level with the generally cylindrical inner surface.

5. The stator as recited in clause 4, further comprising 2 wedges for each slot.

6. A stator for an electric machine having a generally cylindrical body provided an inner surface and an outer surface, the inner surface including slots defining inwardly facing teeth configured to receive prewound coils thereonto; each slot including a generally triangular projection configured and sized as to be in proximity of the prewound coils.

7. The stator as recited in clause 6, wherein the generally triangular projection includes a void.

8. The stator as recited in any of clauses 6 to 7, further comprising at least one wedge used to close each slot.

9. The stator as recited in any of clauses 6 to 8, wherein the generally triangular projections are generally level with the inner surface of the generally cylindrical body.

10. The stator as recited in clause 9, further comprising two wedges for each slot.

What is claimed is:

1. A stator for an electric machine comprising a plurality of stacked laminations each including inwardly facing slots defining inwardly facing teeth configured to receive prewound coils thereonto; each slot including a generally triangular projection configured and sized as to be in proximity of the prewound coils, wherein the triangular projection is a lesser height than a height of the teeth; and at least one wedge used to close each slot, wherein the wedge extends between two adjacent teeth of the inwardly facing teeth and over a top of the generally triangular projection between the two adjacent teeth, wherein there is a resin between the wedge and an insulating paper, and wherein the insulating paper surrounds the prewound coils.

2. The stator as recited in claim 1, wherein the generally triangular projection includes a triangular void.

3. The stator as recited in claim 1, wherein the teeth comprise wedge-receiving indentations at a location above an apex of an adjacent generally triangular projection.

4. A stator for an electric machine having a generally cylindrical body provided an inner surface and an outer surface, the inner surface including slots defining inwardly facing teeth configured to receive prewound coils thereonto; each slot including a generally triangular projection configured and sized as to be in proximity of the prewound coils, wherein the triangular projection is a lesser height than a height of the teeth; and
    at least one wedge used to close each slot, wherein the wedge extends between two adjacent teeth of the inwardly facing teeth and over a top of the generally triangular projection between the two adjacent teeth, and a filling resin below the wedge and over the top of the generally triangular projection between two adjacent teeth.

5. The stator as recited in claim 4, wherein the generally triangular projection includes a triangular void.

6. The stator as recited in claim 4, wherein the teeth are wider than the generally triangular projection.

* * * * *